United States Patent
Watson

(10) Patent No.: US 12,440,875 B2
(45) Date of Patent: Oct. 14, 2025

(54) AIR WIPE TIMED BASE STATION FOR DRIVESHAFTS

(71) Applicant: TOYOTA MOTOR ENGINEERING & MANUFACTURING NORTH AMERICA, INC., Plano, TX (US)

(72) Inventor: Michael D. Watson, Ewing, KY (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 574 days.

(21) Appl. No.: 17/722,647

(22) Filed: Apr. 18, 2022

(65) Prior Publication Data

US 2023/0330713 A1    Oct. 19, 2023

(51) Int. Cl.
B08B 13/00    (2006.01)
B08B 5/02    (2006.01)

(52) U.S. Cl.
CPC .............. B08B 13/00 (2013.01); B08B 5/02 (2013.01); *B08B 2240/00* (2013.01)

(58) Field of Classification Search
CPC ..... A47L 5/14; A47L 9/02; A47L 5/02; A47L 13/00; A47L 2240/00
USPC ................... 15/316.1; 134/30; 239/8
See application file for complete search history.

(56) References Cited

U.S. PATENT DOCUMENTS

| | | | | |
|---|---|---|---|---|
| 3,765,051 A | * | 10/1973 | Wanat | B01D 46/682 |
| | | | | 134/152 |
| 3,805,317 A | * | 4/1974 | Dickinson | D06G 1/00 |
| | | | | 15/309.2 |
| 4,027,355 A | * | 6/1977 | Mead | A47L 23/263 |
| | | | | 15/310 |
| 5,351,354 A | * | 10/1994 | Hasumi | B08B 7/02 |
| | | | | 15/309.2 |
| 10,461,512 B2 | | 10/2019 | Temple | |

FOREIGN PATENT DOCUMENTS

| | | |
|---|---|---|
| CN | 209214298 U | 8/2019 |
| CN | 112485193 A * | 3/2021 |
| CN | 213119738 U | 5/2021 |
| CN | 213860283 U | 8/2021 |
| KR | 101659334 B1 | 9/2016 |

OTHER PUBLICATIONS

Nex Flow Air Products Corp., "Ring Blade® Air Wipe," Nex Flow Air Products—Global leader in specialized compressed air technology (https://www.nexflow.com/products/energy-efficient-blow-off-products/ring-blade-air-wipe-blowoff-systems/ring-blade-air-wipes/).

Raico Engineers, "Drying Rods and Tubes," Raico Engineers (https://raicoengineers.com/case_studies3.htm).

* cited by examiner

*Primary Examiner* — Monica S Carter
*Assistant Examiner* — Sharonda T Felton
(74) *Attorney, Agent, or Firm* — SHEPPARD, MULLIN, RICHTER & HAMPTON LLP; Daniel N. Yannuzzi

(57) ABSTRACT

Systems are provided for a base station to house an air wipe device. Certain embodiments of the base station may include a plunger that activates a pneumatic timer when depressed to compress an accompanying spring. The base station may be formed to optimize the process of removing particles from a driveshaft spline.

15 Claims, 5 Drawing Sheets

AIR WIPE TIMED BASE STATION FOR DRIVESHAFTS

TECHNICAL FIELD

The present disclosure relates generally to maintenance and construction of drive shaft splines, and in particular, relates to the use of air wipe devices to remove particles from drive shaft splines.

DESCRIPTION OF RELATED ART

Many vehicles include drive shaft splines, which are ridges or teeth on a drive shaft that match with grooves in a mating piece. These drive shaft splines may be cleaned before application in a vehicle. One such method for cleaning drive shaft splines is to use an air wipe device. Air wipe devices produce a ring of air that removes particles from a tube or spline inserted into the air wipe device. Conventionally, an air supply may be manually turned on to supply air to the air wipe device. The application of a mechanical base station can optimize this process and eliminate manual effort.

BRIEF SUMMARY OF THE DISCLOSURE

According to various embodiments of the disclosed technology, a system for removing particles from an object comprises a station adapted to receive the object, the station comprising: an aperture to receive the object; a plunger proximate to the aperture, wherein the plunger is depressed by the object when the station receives the object in the aperture; an air wipe device, wherein the air wipe device is activated when the plunger is depressed; and a cleaning medium, wherein the cleaning medium is dispensed from the air wipe device to remove particles from the object.

In some embodiments, the system further comprises a spring, wherein the spring is connected to the plunger, and wherein the spring compresses when the plunger is depressed.

In some embodiments, the system further comprises a timer, wherein the timer is activated when the plunger is depressed, and wherein the air wipe device is deactivated upon expiration of the timer.

In some embodiments, the base further comprises an exterior plate that surrounds the air wipe device.

In some embodiments, the plunger comprises a nylon plunger.

In accordance with another embodiment, a method for removing particles from a drive shaft spline comprises: receiving the driveshaft spline in an air wipe device;
  depressing a plunger in response to the application of force from the driveshaft spline; compressing a spring connected to the plunger in response to the force; activating a timer connected to a plurality of valves, wherein the timer is set with a predetermined amount of time; activating the air wipe device; and removing a plurality of particles from the drive shaft spline using the air wipe device.

In some embodiments, the air wipe device deactivates if no force is applied to the plunger.

In some embodiments, the timer resets if no force is applied to the plunger.

In some embodiments, the method further comprises collecting the plurality of particles in an exterior plate surrounding the air wipe device.

In some embodiments, the method further comprises deactivating the air wipe device after the predetermined amount of time and resetting the timer, regardless of whether force is applied to the plunger.

The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems disclosed herein can provide a base station for an air wipe device to remove particles from driveshaft splines. However, the systems described herein can accommodate various shapes and objects beyond driveshaft spines. The systems described can clean multiple types of objects, including tubing, gears, rods, and other mechanical parts. Embodiments of the systems disclosed herein can apply a cylindrical air wipe device to remove all particles on and around a spline simultaneously. Air wiping involves cleaning tubes, splines, rods, or other objects with compressed air. Air wipe devices assist with sanitation by only cleaning the splines with air, such that no other objects or chemicals need to touch the object being cleaned. Embodiments of the present invention provide a base station for an air wipe device that also assists in automatically activating the air wipe device. This base station provides support for the air wipe device and any splines to be cleaned while shortening the time needed to fully clean a drive shaft spline. Using the spline itself to activate the air wipe device, the base station provides an efficient system for cleaning splines. Before discussing the base station and embodiments of the systems disclosed herein, an exemplary air wipe device is described. Although one type of air wipe device is described here, the systems described herein can apply to various types of air wipe devices, such as cable air wipe devices, cooling air wipe devices, and air amplifiers.

Figure 1:
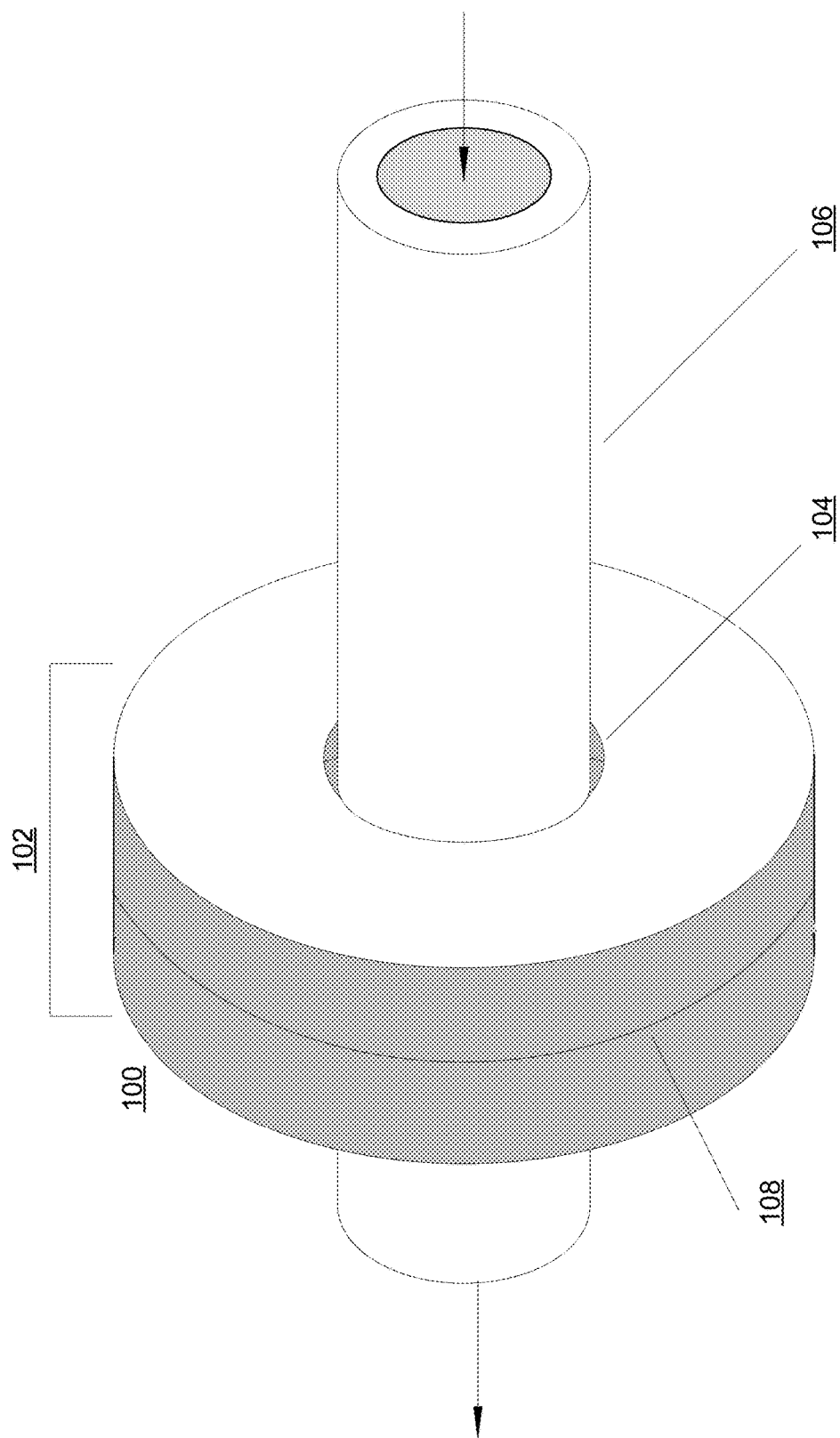
FIG. 1 is a front and side view of an exemplary air wipe device used in embodiments described herein.

FIG. 1 illustrates an example air wipe device to accompany the embodiments described herein. Air wipe device 100 can clean a driveshaft spline or any cylindrical tube or rod. A driveshaft spline may be any rod-like component that can transmit torque from a vehicle's engine to the wheels. The driveshaft spline may comprise multiple components, wherein one component comprises ridges or teeth to match with a mating piece, such that the component transfers torque to the mating piece to maintain angular correspondence. In one embodiment, driveshaft spline 106 can be cleaned by air wipe device 100 to prepare for future installation in a vehicle.

Air wipe device 100 may have a cylindrically shaped body 102 with a hollow middle section or aperture 104. This hollow middle section 104 may be designed to be larger than the driveshaft spline 106 to be cleaned, such that the driveshaft spline 106 may be inserted through the hollow middle section 104. The length of air wipe device 100 can be shorter than the driveshaft spline 106 so that the driveshaft spline 106 can be reached at either end of air wipe device 100 after insertion. Compressed air flows through multiple inlets 108 that wrap around the hollow middle section 104 towards the center of the middle section 104, such that a 360 degree ring of air flows from the inlets 108 into the hollow middle section 104. The ring of air may flow at a high volume and pressure, such that any particles on the driveshaft spline 106 are removed.

To turn on air wipe devices, a user typically turns on a main valve of an air supply operatively connected to an air wife device such that air flows from the air supply to the air wipe device through one or more valves connected to the air supply. The air supply may be engaged by activating a pneumatic timer or other valve. In the case of a pneumatic timer, the timer can switch the main valve to the air supply, allowing air to flow to the air wipe device. The timer can subsequently count down based on a predetermined time delay. When the time delay expires, the timer can shut off the main valve, ceasing any air flow to the air wipe device.

Figure 2:
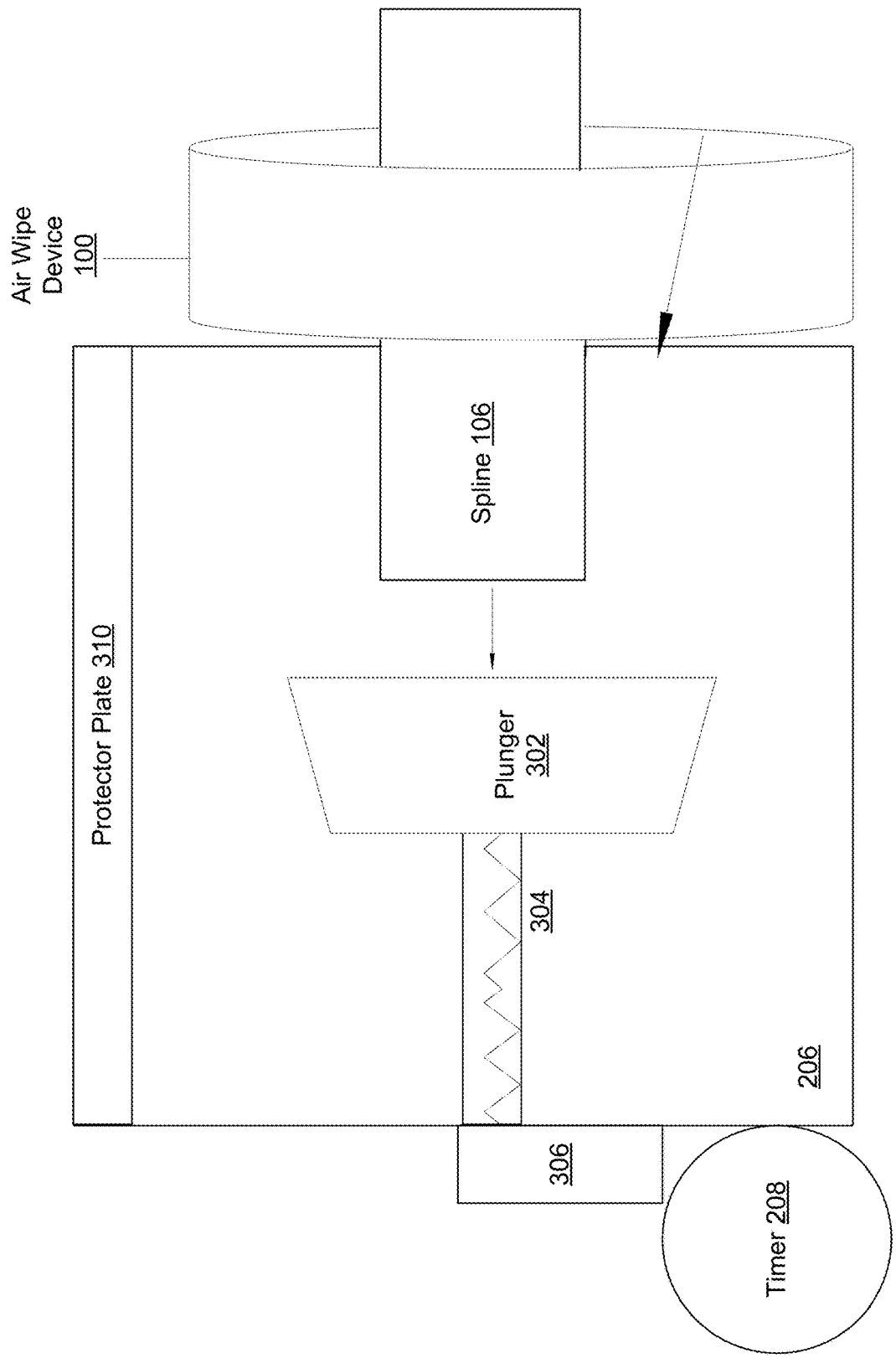
FIG. 2 illustrates how an air wipe device may be activated in accordance with one embodiment.

FIG. 2 illustrates an example of a frame and stand for the air wipe device, in accordance with the embodiments described herein. The stand may comprise any type of stand, including tripods, round base, overhead, or low profile stands. In one embodiment, the frame and stand comprises a base station with one or more vertical rods 202 secured to a horizontal rod 204. Horizontal rod 204 may be fastened to the floor or may be freestanding. Vertical rods 202 and horizontal rod 204 may comprise steel rods, but may also be made of other materials, including, but not limited to, copper, aluminum, or other metals.

Vertical rods 202 may be connected by a hollow box structure 206. In some embodiments, this box structure 206 may be fastened to vertical rods 202, with the vertical rods 202 passing through box structure 206. Air wipe device 100 may be fastened to the outside of box structure 206, or may rest inside box structure 206. Air wipe device 100 may be connected to an air supply by tubing or other channels where air can flow from the supply to air wipe device 100. In some embodiments, the base station may comprise one or more pneumatic timers that release the main valve for the air supply on a time delay. The base station may also comprise one or more gauges to measure the air flow from the supply to air wipe device 100. Driveshaft spline 106 can pass through air wipe device 100 into box structure 206 to activate air wipe device 100.

Figure 3:
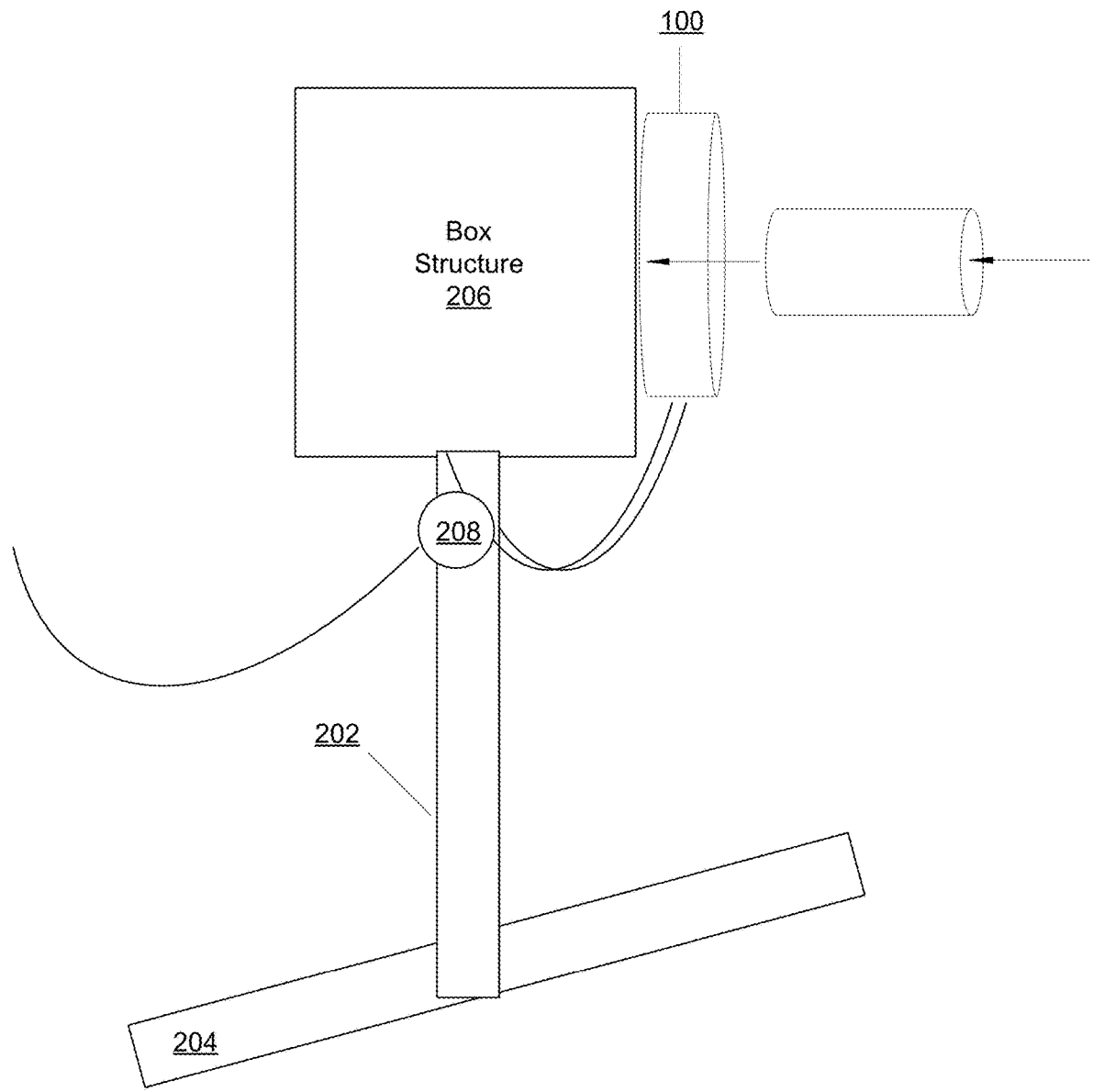
FIG. 3 is a side view of a base station in accordance with embodiments disclosed herein.

FIG. 3 illustrates an example interior of box structure 206 and the structure that activates air wipe device 100. As mentioned above, driveshaft spline 106 can pass through air wipe device 100 into box structure 206, moving towards plunger 302. Plunger 302 may take any shape or can be any type of plunger, such as a standard plunger, flange plunger, accordion plunger, or a taze plunger, and may be constructed of nylon, silicone, or other materials. As plunger 302 is depressed, spring 304 is compressed towards lever 306 to activate timer 208. Spring 304 may be measured such that lever 306 only moves when spring 304 is compressed a specific distance. As described above, timer 208 may comprise a pneumatic timer that can switch a main valve to an air supply after a predetermined time. Therefore, once plunger 302 is depressed and spring 304 is compressed, air will flow to air wipe device 100 to clean driveshaft spline 106. To secure box structure 206 during a cleaning, protector plate 310 can be fastened to the top of the box structure to prevent particles from escaping the box structure.

In other embodiments plunger 302 and spring 304 can be replaced with one or more sensors to detect the presence of the driveshaft spline 106 and activate timer 208. These sensors can include movement sensors, biometric sensors, environmental sensors, or other sensors to detect the presence of driveshaft spline 106. In one embodiment, sensors may be included to detect one or more conditions directly or indirectly such as, movement in box structure 206, force measurements as plunger 302 is depressed, or other prerequisites to activate the air supply.

In some embodiments, one or more of the sensors may include their own processing capability to compute the results for additional information that can be provided to an electronic control unit. In other embodiments, one or more sensors may be data-gathering-only sensors that provide only raw data to the electronic control unit. In further embodiments, hybrid sensors may be included that provide a combination of raw data and processed data to the electronic control unit. Sensors may provide an analog output or a digital output.

In other embodiments, driveshaft spline 106 can activate the main valve of the air supply by depressing plunger 302 and holding driveshaft spline 106 in a depressed position instead of activating a pneumatic timer. In this case, when driveshaft spline 106 no longer applies force to plunger 302, lever 306 can directly switch the main valve to the air supply as opposed to timer 208.

Figure 4:
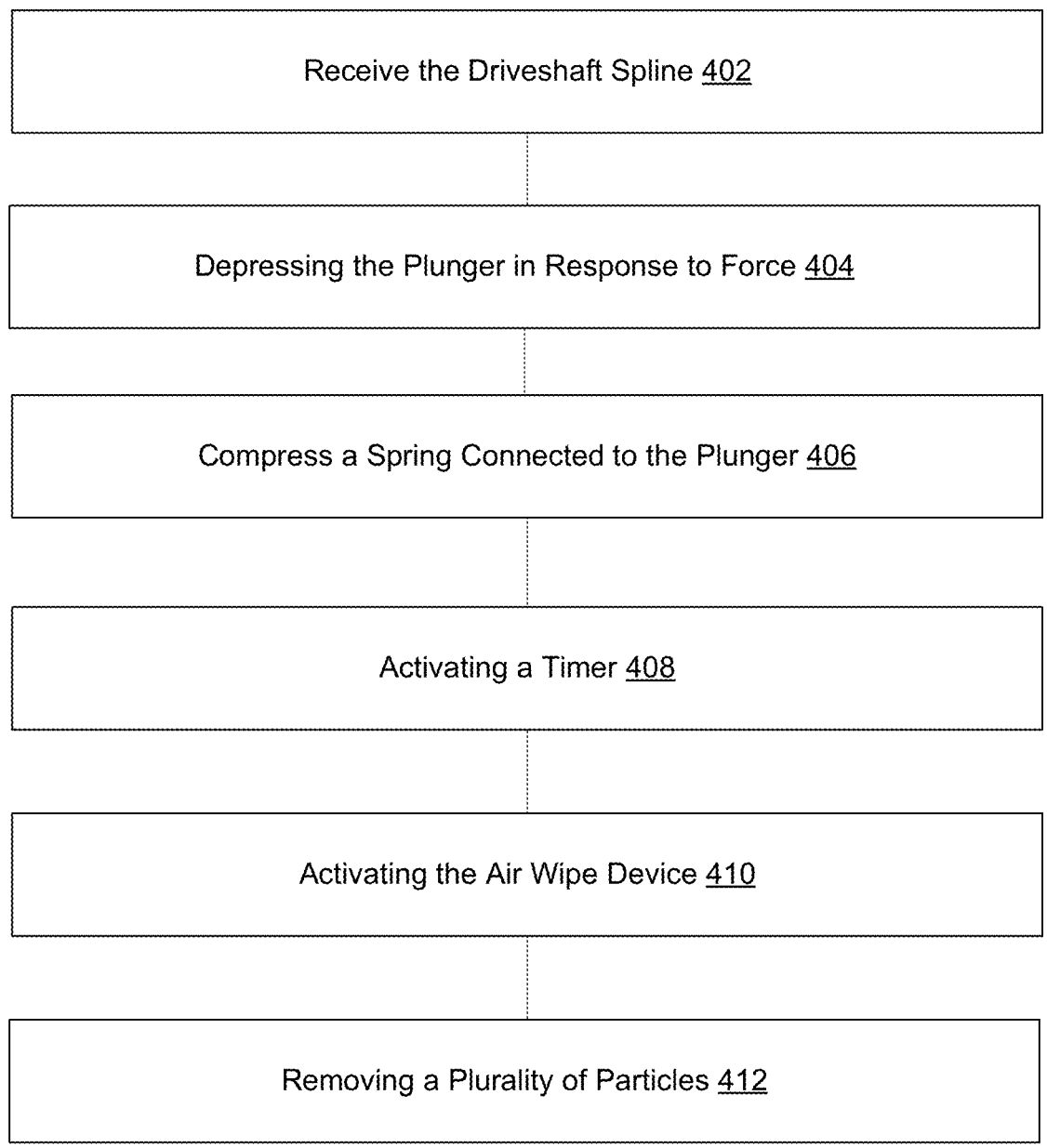
FIG. 4 is an exemplary process in accordance with embodiments disclosed herein.

FIG. 4 illustrates an example process in accordance with the embodiments described above. At block 402, air wipe device 100 can receive driveshaft spline 106 through hollow middle section 104. As described above, driveshaft spline 106 can enter box structure 206 and move towards plunger 302.

At block 404, plunger 302 can be depressed in response to the application of force against plunger 302. Plunger 302 may directly receive force from driveshaft spline 106 or may receive force from another object. Plunger 302 may comprise sensors detect the applied force and may measure the force before depressing the plunger. The sensors may also determine whether the force applied reaches a threshold value. As described above, plunger 302 may also comprise sensors to detect the presence of driveshaft spline 106. In some embodiments, the sensors may detect driveshaft spline 106 without the application of force on plunger 302.

At block 406, spring 304 can be compressed when plunger 302 receives force. As described above, spring 304 may be compressed a particular distance to activate lever 306, which may be adjustable according to the length of spline 106.

At block 408, lever 306 can activate timer 208 to initiate a time delay. This time delay can switch the main valve to an air supply so that air flows towards air wipe device 100. As described above, at the expiration of the time delay, timer 208 can automatically switch the main valve to stop air flow.

At block 410, air wipe device 100 can activate and supply a ring of air as described above in FIG. 1. Accordingly, at block 412, a plurality of particles can be removed from spline 106 with the ring of air produced by air wipe device 100. These particles can include, but are not limited to, excess chemicals, dust and other solid particles.

Figure 5:
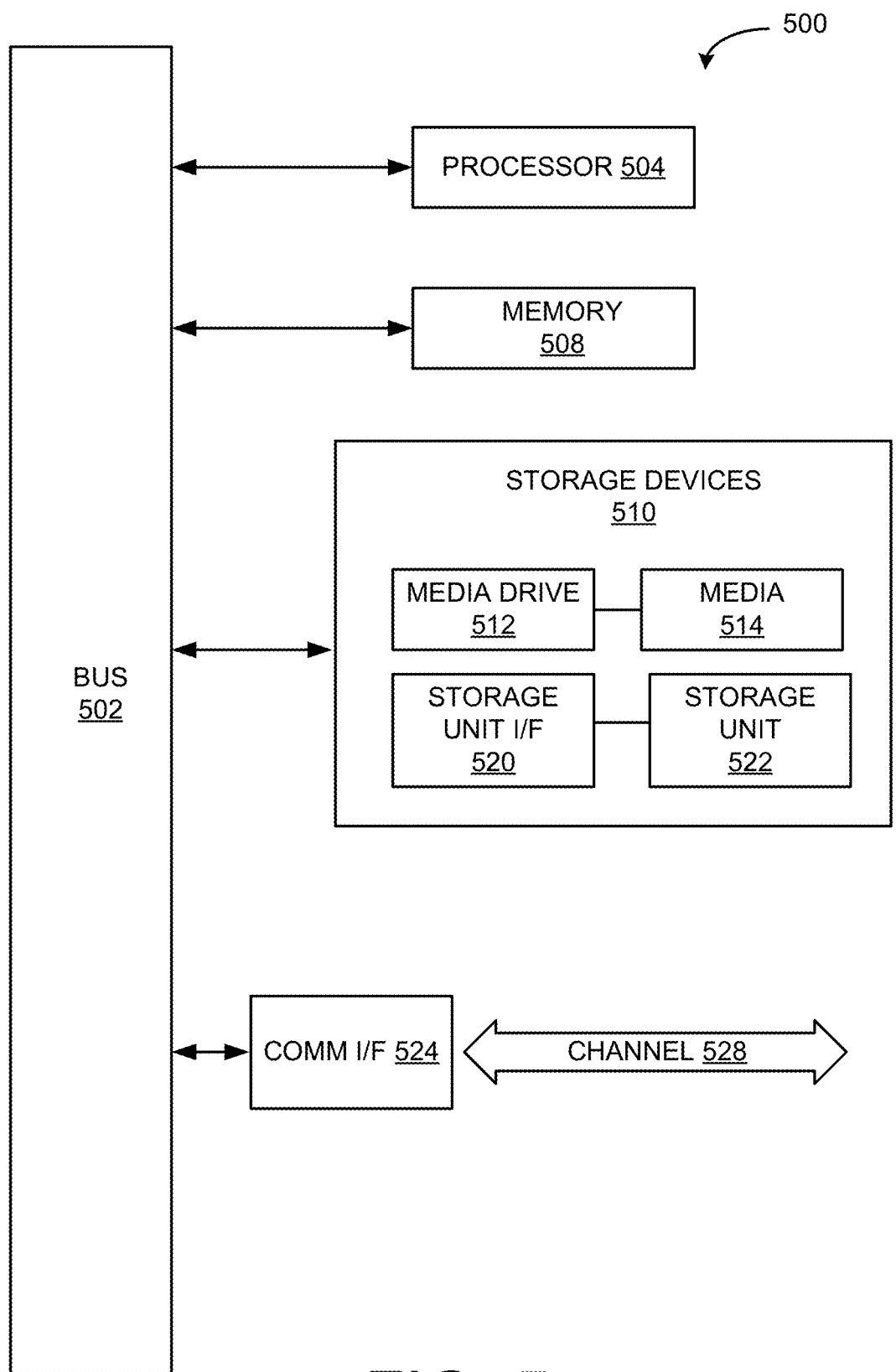
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up user device 102, user system 104, and non-decrypting cloud service 106. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for removing particles from an object, comprising:
   a station adapted to receive the object, the station comprising:
      an aperture to receive the object;
      a plunger proximate to the aperture, wherein the plunger is depressed by the object when the station receives the object in the aperture;
      an air wipe device that at least partially surrounds the object when the object is received in the aperture, wherein the air wipe device is activated when the plunger is depressed; and
      a cleaning medium, wherein the cleaning medium is dispensed from the air wipe device to remove the particles from the object.

2. The system of claim 1, further comprising a spring, wherein the spring is connected to the plunger, and wherein the spring compresses when the plunger is depressed.

3. The system of claim 1, further comprising a timer, wherein the timer is activated when the plunger is depressed, and wherein the air wipe device is deactivated upon expiration of the timer.

4. The system of claim 1, wherein the station further comprises an exterior plate that surrounds the air wipe device.

5. The system of claim 1, wherein the plunger comprises a nylon plunger.

6. A method for removing particles from a drive shaft spline, the method comprising:
   receiving the driveshaft spline in an air wipe device;
   depressing a plunger in response to the application of force from the driveshaft spline;
   compressing a spring connected to the plunger in response to the force;
   activating a timer connected to a plurality of valves, wherein the timer is set with a predetermined amount of time;
   activating the air wipe device; and
   removing a plurality of particles from the drive shaft spline using the air wipe device.

7. The method of claim 6, wherein the air wipe device deactivates if no force is applied to the plunger.

8. The method of claim 7, wherein the timer resets if no force is applied to the plunger.

9. The method of claim 6, further comprising collecting the plurality of particles in an exterior plate surrounding the air wipe device.

10. The method of claim 6, further comprising deactivating the air wipe device after the predetermined amount of time and resetting the timer, regardless of whether force is applied to the plunger.

11. The system of claim 1, wherein the air wipe produces a ring of air directed towards the aperture.

12. The system of claim 2, further comprising a lever, wherein the spring is compressed towards the lever to activate a timer.

13. The system of claim 1, wherein the station further includes a protector plate fastened on top of the station.

14. The system of claim 1, wherein the air wipe device is activated based on applying force from the object to the plunger.

15. The system of claim 12, wherein the timer is activated when the spring is partially compressed towards the lever.

* * * * *